(12) United States Patent
Haner et al.

(10) Patent No.: US 7,199,204 B2
(45) Date of Patent: Apr. 3, 2007

(54) HOT MELT ADHESIVE COMPOSITION

(75) Inventors: Dale L. Haner, Ringwood, NJ (US); Abhay K. Deshpande, Panama City, FL (US); Justin A. Mehaffy, Flemington, NJ (US); George A. Locko, Savannah, GA (US)

(73) Assignees: National Starch and Chemical Investment Holding Corporation, New Castle, DE (US); Arizona Chemical Company, Jacksonville, FL (US)

( * ) Notice: Subject to any disclaimer, the term of this patent is extended or adjusted under 35 U.S.C. 154(b) by 636 days.

(21) Appl. No.: 10/140,692

(22) Filed: May 7, 2002

(65) Prior Publication Data

US 2003/0212202 A1 Nov. 13, 2003

(51) Int. Cl.
*C08F 20/00* (2006.01)
*C08F 22/12* (2006.01)

(52) U.S. Cl. ............... 526/935; 526/318.1; 526/318.2; 526/318.4; 528/88

(58) Field of Classification Search ................ 526/935, 526/317.1, 318.1, 318.2, 318.3, 318.4, 318.5, 526/88; 428/652, 423.1, 481.1; 530/212, 530/215, 216, 218; 528/86, 88, 176, 212, 528/214; 156/327, 335; 525/54.4, 54.42
See application file for complete search history.

(56) References Cited

U.S. PATENT DOCUMENTS

| | | | |
|---|---|---|---|
| 5,685,758 A * | 11/1997 | Paul et al. .................. | 442/409 |
| 6,022,947 A | 2/2000 | Frihart et al. | |
| 6,117,945 A * | 9/2000 | Mehaffy et al. ............ | 525/159 |
| 6,593,407 B2 * | 7/2003 | Haner et al. ................ | 524/272 |

FOREIGN PATENT DOCUMENTS

| | | | |
|---|---|---|---|
| JP | 07082541 A | * | 3/1995 |
| JP | 95082541 A | | 3/1995 |

* cited by examiner

*Primary Examiner*—Thao Tran
(74) *Attorney, Agent, or Firm*—Sun Hee Lehmann; Cynthia L. Foulke

(57) ABSTRACT

A hot melt adhesive comprising an adhesive polymer and a modified rosin-terpene, preferably a phenol modified rosin terpene. The adhesive is particularly useful in packaging applications.

20 Claims, No Drawings

HOT MELT ADHESIVE COMPOSITION

FIELD OF THE INVENTION

The invention relates to a hot melt adhesive composition having high heat resistance, fast set speed and good cold adhesion.

BACKGROUND OF THE INVENTION

Hot melt adhesives are widely used for various commercial applications such as product assembly and packaging, including cardboard case sealing and carton closing operations. Such hot melt adhesives are applied to a substrate while in its molten state and cooled to harden the adhesive layer.

Most commercially available hot melt adhesives require temperatures of 350° F. (177° C.) or greater to ensure complete melting of all the components and also to achieve a satisfactory application viscosity. While adhesive formulations that can be applied at temperatures below 300° F. (149° C.) can be prepared using low molecular weight components or a high wax content, application viscosity and adhesive properties suffer. While softer or more amorphous components may be added in order to improve adhesion, these components reduce the effective heat resistance.

The use of a hot melt adhesive with exceptionally high heat resistance and, in addition, good cold resistance is important in hot filled packaging applications, e.g., sealing and closing operations for cartons, cases or trays used for packaging molten cheese, yogurt or freshly baked goods, which are subsequently subjected to refrigeration or freezing.

There continues to be a need in the art for improved hot melt adhesives including hot melt adhesives that can be applied at low temperatures, and in particular hot melt adhesives possessing high heat resistance and good cold adhesion.

SUMMARY OF THE INVENTION

The invention provides a hot melt adhesive comprising an adhesive polymer and a tackifer. Tackifiers required for use in the practice of the invention are modified rosins terpenes, preferably phenolic modified rosin-terpenes.

One aspect of the invention is directed to a modified rosin-terpene, preferably a phenol modified rosin-terpene useful as tackifier in hot melt adhesive compositions. Phenol-modified rosin terpenes wherein the weight ratio of rosin to phenol is from about 2.00 to about 3.00 and wherein the weight ratio of rosin to terpene is from about 1.40 to about 2.40 have been discovered to be particularly useful when used to formulate a low application temperature hot melt adhesive having desired heat resistance and cold adhesion properties.

Another aspect of the invention is directed to a hot melt adhesive comprising an adhesive copolymer and a modified rosin-terpene. Preferred for use are modified rosin-terpenes having a molecular weight to softening point ratio of from about 2 to about 10, preferably less than about 8.5. Preferred modified rosin-terpenes for use in the practice of the invention are phenolic-modified rosin-terpenes. The adhesive compositions of the invention will also preferably comprise a wax. In a preferred embodiment, the adhesive copolymer comprises at least one ethylene copolymer. A particularly preferred embodiment the adhesive comprises an ethylene n-butyl acrylate copolymer and/or an ethylene vinyl acetate copolymer. Adhesives encompassed by the invention exhibit high heat resistance and good cold resistance. Low application temperature adhesives are a particularly preferred embodiment.

Still another aspect of the invention is directed to a method of sealing and/or making or forming a case, a carton, a tray, a box or a bag. These methods comprise using a hot melt adhesive comprising an adhesive polymer and a modified rosin-terpene.

Yet another aspect of the invention is directed to an article of manufacture comprising an adhesive polymer and a modified rosin-terpene. In one embodiment, the article of manufacture is a carton, case, tray or bag used for packaging products, said carton, case, tray or bag formed using a hot melt adhesive comprising an adhesive polymer and a modified rosin-terpene. The packaged article may comprise cardboard or paperboard that has been adhered by such hot melt adhesives. In another embodiment, the adhesive is pre-applied to the article, e.g., carton, case, tray or bag during the manufacture thereof, and prior to packaging of a product.

Yet another aspect of the invention is directed to packaged articles contained within a carton, case, tray or bag, in particular packaged food, wherein the carton, case, tray or bag comprises an adhesive containing an adhesive polymer and a modified rosin-terpene.

Another aspect of the invention is directed to a process for bonding a substrate to a similar or dissimilar substrate comprising applying to at least a first substrate a molten hot melt adhesive composition, bringing a second substrate in contact with the composition applied to the first substrate, whereby the first and second substrates are bonded together, said hot melt adhesive comprising an adhesive copolymer and a modified rosin-terpene. Still another aspect of the invention is directed to a method of increasing resistance of a hot melt adhesive to heat and cold comprising using a tackifer comprising at least one modified rosin-terpene.

DETAILED DESCRIPTION OF THE INVENTION

All documents cited herein are incorporated in their entireties by reference.

The invention is directed to a hot melt adhesive comprising an adhesive polymer, a tackifier, and optionally a wax. The tackifier comprises a modified rosin-terpene and may also, if desired, be combined with other tackifying agents including but not limited to modified rosins and/or modified terpenes including hydrogenated derivatives thereof. Preferred modified rosin-terpene tackifying agents will have a molecular weight to softening point ratio of from about 2 to less than about 10, preferable less than about 8.5 down to about 4. When used in combination with other tackifying agents, such as modified rosins, such other agents will preferably also have a molecular weight to softening point ratio of less than about 10. The adhesive of the invention is particularly well-suited for hot filled packaging applications.

It has now been discovered that modified rosin-terpenes when used as tackifer, alone or in combination, in a hot melt adhesive provides hot melt adhesives that possess high heat resistance and good cold resistance. A preferred modified rosin-terpene for use in the practice of the invention is a phenolic modified rosin-terpene. The phenol moiety may be substituted or unsubstituted.

Phenolic modified rosin-terpenes may be prepared by the reaction of rosin, terpene and phenol in the presence of an acid catalyst in an organic solvent. See, Japanese Unexamined Patent Publication Hei 7-82541. It will be appreciated that the terpene and/or rosin component used to prepare the modified rosin-terpene may be a modified rosin or modified terpene, and that preparation of a phenol modified rosin-terpene by reaction of a phenol modified rosin and/or phenol modified terpene is contemplated.

Rosins useful in the preparation of a modified rosin-terpene may be any standard material of commerce known as "rosin", or a feedstock containing rosin. Rosin is mainly a mixture of $C_{20}$, tricyclic fused-ring, monocarboxylic acids, typified by pimaric and abietic acids, which are commonly referred to as "resin acids." Any one or more of the $C_{20}$ cyclic carboxylic acid-containing isomers present in rosin may be used. Rosin which is suitable for use can be obtained from many sources, and can have a wide range of purities. For example, wood rosin may be used, where wood rosin is obtained from Pinus stumps after harvesting the stumps, chipping the stumps into small chips, extracting the chips with hexane or higher-boiling paraffin, and distilling the hexane or paraffin to yield wood rosin. Gum rosin, which is the name given to rosin that is obtained after scoring a pine tree, collecting the exudate sap, and then distilling away the volatile components, may also be used. The rosin may be tall oil rosin, which is a by-product of the Kraft (i.e., sulfate) pulping process for making paper. According to the Kraft process, pinewood is digested with alkali and sulfide, producing tall oil soap and crude sulfate turpentine as by-products. Acidification of this soap followed by fractionation of the crude tall oil yields tall oil rosin and fatty acids. Depending on the fractionation conditions, the rosin may contain variable amounts of fatty acids. Preferably, the rosin used in the present invention contains at least 90 wt % resin acids, and less than 10 wt % fatty acids. Some rosin dimerization product, which may form during the fractionation process, may also be present in the tall oil rosin. A standard grade of rosin is available commercially from Arizona Chemical Company (Jacksonville, Fla.) under the Sylvaros® trademark. Gum rosin, including Chinese gum rosin, is another rosin which can be used to prepare modified rosins for use in the practice of the invention esters of the invention. Particularly preferred for use in the practice of the invention are tall oil rosins, gum rosins and wood rosins.

Terpenes are cyclic, unsaturated, $C_{10}$ hydrocarbons obtained from the Kraft process for making paper, turpentines and citrus oils. Examples of terpene compounds include alpha-pinene, beta-pinene, d-limonene, dipentene (racemic limonene), delta-3 carene, camphene, terpinene and the like. Preferred for use is alpha-pinene.

A phenolic compound has at least one hydroxyl group directly bonded to an aromatic ring. The parent phenolic compound is phenol itself. Other phenolic compounds are derivatives of phenol wherein 0 to 2 of the aromatic hydrogens are replaced with an equal number of substituents independently selected from hydroxyl; $C_1$–$C_{12}$ alkyl; $C_1$–$C_{12}$ alkyl substituted with 1 or 2 groups selected from hydroxyl and phenyl; phenyl; and phenyl substituted with 1 or 2 groups selected from hydroxyl and $C_1$–$C_{12}$ alkyl.

Specific derivatives of phenol include cresols (including the ortho, meta and para cresols), 1,3,5-xylenols, $C_{1-22}$ alkylphenol, iso-propylphenol, tert-butylphenol, amylphenol, octylphenol, nonylphenol, diphenylolpropane, phenylphenol, resorcinol, cashew nutshell liquid, bisphenol-A and cumylphenol. Phenolic compounds having a single substituent in the para position (relative to the hydroxyl group) include p-tert-butylphenol, p-octylphenol and p-nonylphenol. A preferred phenolic compound for use in the practice of the invention is phenol.

Examples of acid catalysts include sulfuric acid, hydrochloric acid, phosphoric acid, polyphosphoric acid, boron trifluoride, aluminum trichloride, zinc chloride and p-toluenesulfonic acid. A particularly preferred catalyst for use in the practice of the invention is a boron trifluoride catalyst. The boron trifluoride catalyst will preferably be used at about 8% to about 12% by weight, based on the phenol charge. The amount of catalyst is more preferably from about 9.5% to about 10.5% by weight, based on the phenol charge, and most preferably at about 10% by weight, based on the phenol charge.

Typical solvents include toluene, xylene, or other aromatic hydrocarbon, dichloroethane, chloroform or other halogenated hydrocarbon, ethers, naphtha or other aliphatic hydrocarbon, carbon disulfide and mixtures of aromatic hydrocarbons and aliphatic hydrocarbons.

The reactions are typically carried out at temperatures generally between about 25° C. to about 45° C., more preferably between about 35° C. to about 45° C. The solvent and any unreacted raw materials can be removed from the reaction mixture by distillation to yield the resinous materials. It will be appreciated that the reaction temperature and reaction time will differ based on the types of starting materials, the catalyst used and the compound that is being formed.

In instances where use of a lighter color resin is desired, the phenol, rosin and terpene can be reacted in the presence of a lightening agent or bleaching agent/aid. Examples of conventional lightening agents may be found in U.S. Pat. No. 6,022,947.

It has been discovered that a compatible, low application temperature hot melt adhesive having high heat resistance and good cold adhesion may be prepared using modified rosin-terpenes, in particular phenolic modified rosin-terpenes. Particularly preferred for use are modified rosin-terpenes having a molecular weight to softening point ratio of less than about 10. The ratio of molecular weight to softening point represents a practical measure of a resins ability to provide a low formulated viscosity (via low molecular weight) but contribute to improved heat resistance (via high softening point).

Whether a particular modified rosin-terpene has a molecular weight to softening point ratio of less than about 10 can be easily determined by the skilled practitioner. The molecular weight average, Mw, is measured by dissolving the material in a suitable solvent, e.g., tetrahydrofuran, and subjecting a sample of that solution to Gel Permeation Chromatography (GPC) analysis. The retention time and elution profile of polystyrene standards of known molecular weight (commercially available from many Chromatography supply houses, e.g., Supelco, Inc. or Waters Associates) provides weight average molecular weight data in grams/mole. The softening point is measured by a Mettler FP90 Central Processor and a Mettler FP83 HT Dropping Point cell with a softening point ring, and are reported in degrees centigrade (° C.). The molecular weight to softening point ratio is the molecular weight of the modified rosin-terpene divided by its softening point. When other tackifying agents are used in combination with the modified rosin-terpene, such tackifying agents (e.g., modified rosins) will preferably also have a molecular weight to softening point ratio of less than about 10.

A commercially available phenolic modified rosin-terpene that can advantageously be used in the practice of the invention is, Sylvares™ MR 135, available from Arizona Chemical Company, Jacksonville, Fla.

The weight ratio of rosin to terpene and the weight ratio of rosin to phenol used to prepare the phenol modified rosin-terpenes used in the practice of the invention is adjusted based on the performance properties desired and/or required for a particular end-use application in order for the formulated adhesive to have the desired balance of heat stress and cold tolerance. The selection of monomers and the amounts thereof used to prepare the tackifying composition is important to achieving a balance of desired properties. These parameters can be selected based on conventional statistical analysis or design or experiments (DOE) designed to test resins compositions and the performance properties of adhesives containing such resins. Such experimentation is routine in the art. Performance properties can be tested as described in the examples.

Preferred are rosin terpene phenol resins with a Ring & Ball softening point of 125° C. to about 150° C., an acid number of 25 to 85 and having a weight average molecular weight of 600 to 1000 grams/mole.

By adjusting the weight ratio of rosin to phenol and the weight ratio of rosin to terpene used in the preparation of phenolic-modified rosin terpene resins it has been discovered that resins may be prepared which provide the high heat resistance (measured by heat stress), low cloud point and an acceptable viscosity, and preferably fast set speed and good cold adhesion needed in low application temperature hot melt adhesives.

Amounts of components can be chosen for the purpose of producing equations based on DOE analysis which would describe the properties tested (e.g., heat stress, cloud point, viscosity, fast set speed, good cold adhesion) and thereafter allow prediction of preferred composition formulations. It is well within the skill of the art to prepare phenol modified rosin terpene tackifiers having preferred levels of phenol, rosin to terpene ratios, process temperature, rosin type, terpene type, softening point, color, etc., based on such predictions to obtain embodiments having a desired and preferred combination of heat stress, cloud point, viscosity, and the like when used in the preparation of an adhesive of the invention. Methods of testing for such properties is known in the art and/or described in the examples.

While the amount of phenol, rosin, terpene and the types thereof that can be used in preparing the phenol modified rosin terpenes for use in the practice of the invention is limited only by the adhesive properties desired and/or required for a particular application, which components and the amounts thereof can be as can be readily determinable by one skilled in the art, hot melt adhesives that can be applied at a low application temperature and that possess desirable adhesive performance (e.g. heat stress cloud point, viscosity) can be prepared using phenol modified rosin—terpene resins having a weight ratio of rosin to phenol of from about 2.0 to about 3.0 and a weight ratio of rosin to terpene is from about 1.4 to about 2.4. When prepared for use in adhesives to be applied at low temperature, the weight ratio of rosin to phenol is preferably from about 2.0 to about 2.8, more preferable from about 2.1 to about 2.8 and most preferable from about 2.1 to about 2.7, and the weight ratio of rosin to terpene is preferable from about 1.4 to about 2.2, more preferably from about 1.5 to about 2.2 and most preferable from about 1.5 to about 2.0.

In the practice of the invention, hot melt adhesives for low temperature application will preferably have a heat stress value of equal to or greater than about 52° C. (125° F.), a cloud point equal to or less than about 104° C. (220° F.) and a viscosity equal to or less than about 1300 cps at 250° F.

The modified rosin-terpene component will typically be used in amounts of from about 10 to about 60 weight percent, more typically from about 25 to about 45 weight percent, by weight of the adhesive composition.

Any base polymer suitable for use in formulating hot melt adhesives, as are well known to those skilled in the art may be used in the practice of the invention. Such polymers include amorphous polyolefins, ethylene-containing polymers and rubbery block copolymers, as well as blends thereof. In a preferred embodiment, the adhesive comprises at least one ethylene copolymer, and may comprise a blend of two or more polymers. The term ethylene copolymer, as used herein, refers to homopolymers, copolymers and terpolymers of ethylene. The polymer component will usually be present in an amount of from about 10% to about 60%, more preferably from about 20% to about 45%, more preferably from about 25% to about 35%. Examples of ethylene copolymers include copolymers with one or more polar monomers which can copolymerize with ethylene, such as vinyl acetate or other vinyl esters of monocarboxylic acids, or acrylic or methacrylic acid or their esters with methanol, ethanol or other alcohols. Included are ethylene vinyl acetate, ethylene methyl acrylate, ethylene ethyl acrylate, ethylene n-butyl acrylate, ethylene acrylic acid, ethylene methacrylate and mixtures and blends thereof. Other examples include but are not limited to recycled polyethylene terphthalate and polyethylene, ethylene/α-olefin interpolymers, poly-(butene-1-co-ethylene), atactic polypropylene, low density polyethylene, homogenous linear ethylene/α-olefin copolymers, lower melt index n-butyl acrylate copolymers, ethylene vinyl ester copolymers). Random and block copolymers, as well as blends thereof may be used in the practice of the invention.

Preferred adhesives for use in the practice of the invention comprise at least one ethylene n-butyl acrylate copolymer. Even more preferred are adhesives comprising ethylene n-butyl acrylate and at least one additional polymer. The at least one additional polymer is desirably also an ethylene copolymer, but other types of polymers may also be used. The additional polymers include, but are not limited to, ethylene vinyl acetate, ethylene methyl acrylate, ethyleneethyl acrylate, ethylene acrylic acid copolymers, polyethylene, polypropylene, poly(butene-1-co-ethylene) polymers and low molecular weight and/or low melt index ethylene n-butyl acrylate copolymers. When such additional polymer is present, it is present in amounts of up to about 25 weight percent, usually from about 5 to about 25 weight percent, preferably up to about 20 weight percent and most preferable from about 2 weight percent up to about 15 weight percent by weight of the adhesive composition.

The desired polar monomer content in the ethylene copolymer is generally from about 1 to about 60 wt %, preferably 15 to 45 wt %, more preferably over 25 wt %. The ethylene copolymer preferably has a melt index of from about 10 to about 5000 grams/10 minutes.

Particularly preferred adhesives comprise an ethylene n-butyl acrylate copolymer containing up to about 45% by weight, typically 15 to 35% of n-butyl acrylate and has a melt index of at least about 900. Most preferably, the copolymer also comprises up to about 25% by weight of ethylene vinyl acetate. Even more preferably ethylene vinyl acetate component comprises less than about 30% vinyl acetate.

Ethylene n-butyl acrylate copolymers are available from Elf Atochem North America, Philadelphia, Pa. under the tradename Lotryl®, from Exxon Chemical Co. under the tradename Enable® (e.g., EN33330 which has a melt index of about 330 grams/10 minutes and an n-butyl acrylate content of about 33% by weight in the copolymer and EN33900 which has a melt index of about 900 and an n-butyl acrylate content of about 35% by weight) and from Millennium Petrochemicals under the tradename Enathene® (e.g., EA 89822 which has a melt index of about 400 grams/10 minutes and a n-butyl acrylate content of about 35% by weight in the copolymer).

Ethylene vinyl acetate copolymers are available from DuPont Chemical Co., Wilmington, Del. under the tradename Elvax® (e.g., Elvax® 210 which has a melt index of 400 grams/10 minutes and a vinyl acetate content of 28% by weight in the copolymer, Elvax® 205W which has a melt index of 800 and a vinyl acetate content of about 28% by weight in the copolymer and Elvax® 410 which has a melt index of 500 and a vinyl acetate content of about 18% by weight). Other ethylene vinyl acetate copolymers are available from Exxon Chemical Co. under the tradename Escorene® (e.g., UL 8705) and also from Millennium Petrochemicals, Rolling Meadows, Ill., under the tradename Ultrathene® (e.g., UE 64904) and AT® copolymers available from AT Polymers & Film Co., Charlotte, N.C. (e.g., AT® 1850M).

Ethylene methyl acrylate copolymers are also useful and are available from Exxon Chemical Co. under the tradename Optema® (e.g., Optema® XS 93.04 which has a melt index of about 270 grams/10 minutes and a methyl acrylate content of about 20% by weight in the copolymer).

Other useful polymers include ethylene n-butyl acrylate carbon monoxide copolymers from DuPont under the tradename Elvaloy®, amorphous polyalphaolefin polymers from Rexene Products Co. in Dallas, Tex. under the tradename Rextac®), from Eastman Chemical Co. under the tradename Eastoflex®, from Creanova under the tradename Vestoplast®, and polyethylene homopolymers from Eastman Chemical Co. under the tradename Epolene®. Other useful polymers include Exact® 5008, an ethylene-butene polymer; Exxpol® SLP-0394, an ethylene-propylene polymer; Exact® 3031, an ethylene-hexene polymer all available from Exxon Chemical Co.; and Insight® SM-8400, an ethylene-octene polymer available from Dow Chemical Co. Midland, Mich. Ethylene methyl acrylate polymers containing from about 10 to about 28 weight % by weight methyl acrylate and ethylene acrylic acid copolymers having acid numbers of 25 to 150 may also be used in the practice of the invention.

Waxes suitable for use in the present invention include paraffin waxes, microcrystalline waxes, high density low molecular weight polyethylene waxes, by-product polyethylene waxes, Fischer-Tropsch waxes, oxidized Fischer-Tropsch waxes and functionalized waxes such as hydroxy stearamide waxes and fatty amide waxes. It is common in the art to use the terminology synthetic high melting point waxes to include high density low molecular weight polyethylene waxes, by-product polyethylene waxes and Fischer-Tropsch waxes. Modified waxes, such as vinyl acetate modified and maleic anhydride modified waxes may also be used. The wax component is utilized at levels of greater than about 10 weight percent, typically about 20 to 40 weight percent, by weight of the adhesive.

The paraffin waxes useful herein are those having a ring and ball softening point of about 55° C. to about 85° C. Preferred paraffin waxes are Okerin® 236 TP available from Astor Wax Corporation, Doraville, Ga.; Penreco® 4913 available from Pennzoil Products Co., Houston, Tex.; R-7152 Paraffin Wax available from Moore & Munger, Shelton, CN.; and Paraffin Wax 1297 available from International Waxes, Ltd in Ontario, Canada. Particularly preferred are paraffin waxes having melting points in the range of about 130 to 165° F., such as, for example, Pacemaker available from Citgo, and R-2540 available from Moore and Munger; and low melting point synthetic Fischer-Tropsch waxes having a melting point of less than about 180° F. The most preferred wax is paraffin wax with a melting point of 150° F. Other paraffinic waxes include waxes available from CP Hall under the product designations 1230, 1236, 1240, 1245, 1246, 1255, 1260, & 1262. CP Hall 1246 paraffinic wax is available from CP Hall (Stow, Ohio).

The microcrystalline waxes useful here are those having 50 percent by weight or more cyclo or branched alkanes with a length of between 30 and 100 carbons. They are generally less crystalline than paraffin and polyethylene waxes, and have melting points of greater than about 70° C. Examples include Victory® Amber Wax, a 70° C. melting point wax available from Petrolite Corp. located in Tulsa, Okla.; Bareco® ES-796 Amber Wax, a 70° C. melt point wax available from Bareco in Chicago, Ill.; Okerin® 177, an 80° C. melt point wax available from Astor Wax Corp.; Besquare® 175 and 195 Amber Waxes and 80° C. and 90° C. melt point microcrystalline waxes both available from Petrolite Corp. in Tulsa, Okla.; Indramic® 91, a 90° C. melt point wax available from Industrial Raw Materials located in Smethport, Pa.; and Petrowax® 9508 Light, a 90° C. melt point wax available from Petrowax Pa., Inc. located in New York, N.Y.

Exemplary high density low molecular weight polyethylene waxes falling within this category include ethylene homopolymers available from Petrolite, Inc. (Tulsa, Okla.) as Polywax™ 500, Polywax™ 1500 and Polywax™ 2000. Polywax™ 2000 has a molecular weight of approximately 2000, an Mw/Mn of approximately 1.0, a density at 16° C. of about 0.97 g/cm$^3$ and a melting point of approximately 126° C.

The adhesives of the present invention preferably also contain a stabilizer or antioxidant. These compounds are added to protect the adhesive from degradation caused by reaction with oxygen induced by such things as heat, light, or residual catalyst from the raw materials such as the tackifying resin.

Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis (2,6-tert-butyl-phenol); 4,4'-thiobis (6-tert-butyl-o-cresol); 2,6-di-tertbutylphenol; 6-(4-hydroxyphenoxy)-2,4-bis (n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

The performance of these antioxidants may be further enhanced by utilizing, in conjunction therewith, known synergists such as, for example, thiodipropionate esters and phosphites. Distearylthiodipropionate is particularly useful. These stabilizers, if used, are generally present in amounts of about 0.1 to 1.5 weight percent, preferably 0.25 to 1.0 weight percent.

Such antioxidants are commercially available from Ciba-Geigy, Hawthorne, N.Y. and include Irganox® 565, 1010 and 1076 which are hindered phenols. These are primary antioxidants which act as radical scavengers and may be used alone or in combination with other antioxidants such as phosphite antioxidants like Irgafos® 168 available from Ciba-Geigy. Phosphite catalysts are considered secondary catalysts and are not generally used alone. These are primarily used as peroxide decomposers. Other available catalysts are Cyanox® LTDP available from Cytec Industries in Stamford, CN., and Ethanox® 1330 available from Albemarle Corp. in Baton Rouge, La. Many such antioxidants are available either to be used alone or in combination with other such antioxidants. These compounds are added to the hot melts in small amounts and have no effect on other physical properties. Other compounds that could be added that also do not affect physical properties are pigments which add color, or fluorescing agents, to mention only a couple. Additives like these are known to those skilled in the art.

Depending on the contemplated end uses of the adhesives, other additives such as plasticizers, pigments and dyestuffs conventionally added to hot melt adhesives may be included. In addition, small amounts of additional tackifiers and/or waxes such as microcrystalline waxes, hydrogenated castor oil and vinyl acetate modified synthetic waxes may also be incorporated in minor amounts, i.e., up to about 10 weight percent by weight, into the formulations of the present invention.

The adhesive compositions of the present invention are prepared by blending the components in the melt at a temperature of above about 120° C., typically at about 150° C. until a homogeneous blend is obtained, usually about two hours is sufficient. Various methods of blending are known in the art and any method that produces a homogeneous blend is satisfactory.

The resulting adhesives are characterized by a viscosity less than about 3000 cps at 150° C. They may be applied at low temperatures to provide superior adhesive bonds even when exposed to a wide variety of temperature conditions. By low application temperature means that the adhesive is applied at temperatures below about 150° C., preferable below about 140° C., more preferably below about 130° C. The adhesives possess excellent heat resistance and cold resistance. High heat resistance means the ability to maintain a fiber tearing bond at elevated temperatures of about 140° F. Cold resistance is the ability to maintain a high strength bond in the cold with no tendency to fracture at 40° F. (4° C.).

The hot melt adhesives of the invention find use in, for example, packaging, converting, bookbinding, bag ending and in the nonwovens markets. The adhesives find particular use as case, carton, and tray forming, and as sealing adhesives, including heat sealing applications, for example in the packaging of cereals, cracker and beer products. Encompassed by the invention are containers, e.g., cartons, cases, boxes, bags, trays and the like, wherein the adhesive is applied by the manufacturer thereof prior to shipment to the packager. Following packaging, the container is heat sealed.

The hot melt adhesives of the present invention are particularly useful in case sealing applications where exceptionally high heat resistance in addition to cold resistance is important, i.e., in hot filled packaging applications; e.g. sealing and closing operations for cartons, cases, or trays used in packaging molten cheese, yogurt or freshly baked goods which are subsequently subjected to refrigeration or freezing, and for corrugated cases, which are often subjected to high stresses and adverse environmental conditions during shipping and storage.

The substrates to be bonded include virgin and recycled kraft, high and low density kraft, chipboard and various types of treated and coated kraft and chipboard. Composite materials are also used for packaging applications such as for the packaging of alcoholic beverages. These composite materials may include chipboard laminated to an aluminum foil which is further laminated to film materials such as polyethylene, mylar, polypropylene, polyvinylidene chloride, ethylene vinyl acetate and various other types of films. Additionally, these film materials also may be bonded directly to chipboard or kraft. The aforementioned substrates by no means represent an exhaustive list, as a tremendous variety of substrates, especially composite materials, find utility in the packaging industry.

Hot melt adhesives for packaging are generally extruded in bead form onto a substrate using piston pump or gear pump extrusion equipment. Hot melt application equipment is available from several suppliers including Nordson, ITW and Slautterback. Wheel applicators are also commonly used for applying hot melt adhesives, but are used less frequently than extrusion equipment.

In the following examples, which are provided for illustrative purposes only, all parts are by weight and all temperatures in degrees Celsius unless otherwise noted.

EXAMPLES

Adhesive performance may be evaluated using the following tests. These tests, unless otherwise indicated, were used in the following examples.

Melt viscosities of the hot melt adhesives were determined on a Brookfield Model RVT Thermosel viscometer using a number 27 spindle.

Acid number was measured by techniques known in the art. See, e.g., ASTM D-465 (1982).

Softening points can be measured with a Mettler FP90 Central Processor and a Mettler FP83 HT Dropping point cell with a softening point ring. A heating rate of between about 1° C. and about 2° C. per minute is generally used.

Clarity can be determined qualitatively by heating the adhesive in a glass jar to 121° C. preferably (or to 162° C. if hazy) and placing a thermometer in the glass jar. If the thermometer can be fully seen, the adhesive is determined to be clear; if it could not, the thermometer is gradually moved toward the front of the glass jar and a comparative reading assigned.

Adhesion at various temperatures can be determined by applying a ½ inch wide bead of adhesive widthwise at 121° C. to a 2 inch by 3 inch piece of substrate and immediately bringing a second piece of board into contact (as substrate board can be used e.g., 275 pound burst strength corrugated boardstock. A 200 gram weight is immediately placed on the construction. The bonded specimens are placed in an oven at 55° C. and 60° C., and in freezers at 4.4° C., −6.7° C., and −17.8° C. The bonds are separated by hand and a determination made as to the type of failure. Fiber tearing (FT) and non-fiber tearing bonds (NFT) are noted. "Full" FT generally is used to refer to 95 to 100% fiber tear. "Moderate" refers to 50 to 95% FT. "Slight" refers to 5 to 50% FT; and "None" refers to 0 to 5% FT. The character of the bond failure is also observed and, in the case of bonds that exhibited a brittle crack or shattering of the adhesive interface, this characteristic is noted as "cold crack".

Heat stress was measured by forming a composite construction of adhesive (2×½" compressed) between two pieces of corrugated of specific dimensions. The adhesive bead forming this composite is then placed under approximately 2 pounds of cantilever stress for 24 hours at elevated temperatures. The maximum temperature at which this construction remains in tact for at least 24 hours is then noted.

Cloud point was determined by heating the adhesive blends to 150° C. and applying a small bead (approximately 1 gram) of the molten adhesive to the bulb of an ASTM thermometer. The temperature at which the molten adhesive clouds over is then noted. These measures of cloud point provide an indication of a hot melt's overall compatibility, i.e., the compatibility of the individual ingredients with each other. Products that show cloud points near or at the softening point of the wax used in the formulation reflect an overall compatible product. The cloudiness that develops as the material cools is the result of the developing crystallinity of the waxy component (causing refraction of light passing through the sample). Systems that possess cloud points much greater than the softening point of the wax exhibit a micro separation changing the refraction index of the molten adhesive. Incompatibility is defined as a cloud point of greater than or equal to 250° F. The practical significance of products with high cloud points are as follows:

(1) Poor inherent compatibility with a tendency to phase separation upon prolonged heating, and heating and cooling cycling such as is experienced in commercial operations.

(2) Poor flow properties resulting in "stringing" from rapid fire, air or electric actuated nozzle equipment.

Adhesive set time can be determined in the following manner using 50 pound Kraft paper and an adhesive tester that simulates a case sealing line: Kraft samples 2 inches by 2 inches are placed in the grips of the tester. The bottom specimen (2'×4') is moved forward at a constant speed under the melt nozzle applicator for the application of the adhesive bead and is stopped directly under the top specimen. The vertical cylinder pressure is preset at 20 psi and, after a predetermined open time, the top specimen is moved downward to contact the lower specimen. Contact is maintained for a given compression time and force after which the top substrate is separated from the lower substrate by reversal of the air flow operating the vertical cylinder. The adhesive bead width is adjusted by nitrogen pressure to give a width of ⅛ inch following compression. Typical testing conditions: Open time 1 sec, Vertical Cylinder Pressure 20 psi. The shortest time required to obtain 80% of the adhesive bonds having immediate fiber tearing bonds is reported as set time.

Thermal stability of the adhesive blends is determined in the following manner: 100 grams of adhesive was placed in a clean 8 oz. glass jar and covered with aluminum foil. The jars are then placed in forced-draft ovens at 121° C. or other relevant temperatures and aged for 24, 48, 72 and/or 100 hours. After these time intervals the specimen is analyzed for color change and presence of char and non-thermoplastic material (skin or gel) and the viscosity measured. Unusual behavior such as separation and lack of clarity can be also noted.

Example 1

A phenol modified rosin terpene resin was prepared as follows. A one-liter, three-neck, round-bottom flask equipped with overhead stirring was charged with 38 grams of phenol and 114 grams of xylene solvent. The phenol was dissolved in the solvent and the solution was refluxed azeotropically under a nitrogen atmosphere for two hours to remove any water. The solution was then cooled to room temperature under a nitrogen atmosphere. A boron trifluoride catalyst (3.8 grams) was then charged to the solution and the solution was heated, with stirring, to 40° C.

A blend of 50 grams of alpha pinene (available under the registered trade name Sylvapine® A, available from Arizona Chemical Company, Jacksonville, Fla.) and 100 grams of tall oil rosin (available under the registered trade name Sylvaros® R, available from Arizona Chemical Company, Jacksonville, Fla.) was dissolved under ambient conditions in 153 grams of xylene. The rosin to terpene ratio was 2 and the rosin to phenol weight ratio was 2.63. This solution was added to the phenol-catalyst solution, at 40° C., under a nitrogen atmosphere with stirring. The addition was conducted drop wise over a period of 3 hours, while maintaining the reaction contents at 40° C. Following completion of addition of the pinene-rosin blend, the reaction was stirred for an additional 30 minutes.

The reaction mass was then quenched by adding 100 grams of an aqueous solution of sodium bicarbonate (3.8 grams), sodium hypophosphite (1.9 grams) to the reaction flask. The contents were then stirred at ambient temperature for 15 minutes. Stirring was stopped and the aqueous and organic layers were separated. The organic phase was washed with 100 grams of water and the contents were stirred for 15 minutes at ambient temperature.

Following separation of the organic and aqueous layers, the solvent was distilled from the organic layer. The contents were further heated to a final temperature of 240° C. to remove lower molecular weight terpene-phenol alkylates, rosin light ends, unreacted rosin and terpene-terpene dimers. The final product weighed 166.8 grams, had a Ring & Ball softening point of 135° C., a neat color of Gardner 4 and an acid number of 67.

Example 2

A phenol modified rosin terpene resin was prepared as described in Example 1 except 166 grams of alpha pinene and 66.5 grams of phenol were charged to produce a resin with a rosin to terpene weight ratio of 0.6 and a rosin to phenol weight ratio of 1.5. The final product had a Ring & Ball softening point of 140.4° C., a neat color of Gardner 4—and an acid number of 32.

Example 3

A phenol modified rosin terpene resin was prepared as described in Example 1 except 52.1 grams of phenol were charged to produce a resin with a rosin to terpene weight ratio of 1.5 and a rosin to phenol weight ratio of 1.9. The final product had a Ring & Ball softening point of 137° C., a neat color of Gardner 7—and an acid number of 61.

Example 4

A phenol modified rosin terpene resin was prepared as described in Example 1 except 66.7 grams of alpha pinene and 48.3 grams of phenol were charged to produce a resin with a rosin to terpene weight ratio of 1.5 and a rosin to phenol weight ratio of 2.1. The final product had a Ring & Ball softening point of 137° C., a neat color of Gardner 4—and an acid number of 60.

Example 5

Hot melt adhesives encompassed by the invention were made from a 1:1 blend of ethylene vinyl acetate and ethylene n-butyl acrylate, a paraffin wax, and the rosin terpene phenol resin of Examples 1–4.

In this example, all adhesive formulations were prepared using the following equipment: a bench top glascol mantle; single blade mixing shaft; electric variable speed motor; quart sized cans; and electronic temperature controller. The adhesives were prepared in 100.5 gram batches. The adhesives were compounded by first adding all the wax (30 grams paraffinic), antioxidant (0.5 grams IRGANOX 1010) and polymer (17.5 grams ENABLE 33900 and 17.5 grams ESCORENE UL 8705) to a quart sized can. The can was placed in a glascol heating mantle and allowed to heat up to 150° C. with constant agitation from the mixer. As soon as the solid materials melted and appeared homogeneous at 150° C., the resin (35 grams) was slowly added. The resin (rosin terpene phenolic) was added slowly so as not to agglomerate together or lower the mixing temperature too severely. Once the resin was completely dissolved and had been thoroughly mixed, the adhesive was poured out into 8 ounce jars and allowed to cool. The total time for the adhesive preparation was approximately 1 to 3 hours for the material to be homogeneous. However if the material did not appear homogeneous and clear but cloudy, another additional 45 minutes of mix time was allowed at 165° C. If the sample was still cloudy and hazy, the mixing was stopped and the sample poured out and still tested.

Adhesive properties are shown Table 1.

TABLE 1

| | Resin of Example 1 | Resin of Example 2 | Resin of Example 3 | Resin of Example 4 |
|---|---|---|---|---|
| Heat Stress, ° F. | 125 | 115 | 127.5 | 125 |
| Cloud Point, ° F. | 210 | 150 | 245 | 220 |
| Viscosity, cps @ 250° F. | 1200 | 1080 | 1295 | 1240 |

The results presented in Table 1 illustrate differences in compatibility when rosin terpene phenolics containing different terpene/rosin and rosin/phenol levels are used to prepare adhesives. The data demonstrates that adhesives made with rosin terpene phenolic resins can be modified to have various heat stress values and adhesion performance in both cold and high heat conditions. While all of the adhesives exemplified herein are within the scope of the invention, it is noted that the adhesives comprising the phenol modified rosin-terpene of the type described in Examples 1 and 4 appear particularly well suited for use in the preparation of a low application temperature hot melt adhesives.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A hot melt adhesive comprising an adhesive polymer and a modified rosin-terpene, and having a viscosity of less than about 3000 cps at 150° C.

2. The adhesive of claim 1 wherein the modified rosin terpene is a phenolic modified rosin-terpene.

3. The adhesive of claim 2 wherein the phenol modified rosin-terpene has an average molecular weight to softening point ratio of less than about 10.

4. The adhesive of claim 2 wherein the phenol modified rosin-terpene has a Ring & Ball softening point of from about 125° C. to about 150° C.

5. The adhesive of claim 2 wherein the phenol modified rosin-terpene has an acid number of from about 25 to about 85.

6. The adhesive of claim 2 wherein the phenol modified rosin-terpene has a weight average molecular weight of 600 to 1000.

7. The adhesive of claim 1 further comprising a wax.

8. The adhesive of claim 7 wherein the wax is a paraffin, a microcrystalline wax or a blend thereof.

9. The adhesive of claim 1 wherein the adhesive polymer comprises at least one ethylene copolymer.

10. The adhesive of claim 9 comprising at least one ethylene n-butyl acrylate copolymer.

11. The adhesive of claim 10 further comprising ethylene vinyl acetate.

12. The adhesive of claim 1 comprising from about 10 to about 60% by weight of the modified rosin-terpene.

13. The adhesive of claim 1 which has a heat stress of equal to or greater than about 125° F.

14. The adhesive of claim 1 which has a viscosity of less than about 1300 cps at 250° F.

15. The adhesive of claim 1 which has a cloud point of less than about 220 F.

16. An article of manufacture comprising a hot melt adhesive wherein the adhesive contains an ethylene copolymer and a modified rosin-terpene.

17. A hot melt adhesive comprising an ethylene copolymer and a modified rosin-terpene.

18. The adhesive of claim 17 wherein the modified rosin-terpene is a phenolic modified rosin-terpene.

19. The adhesive of claim 17 wherein the ethylene copolymer is ethylene n-butyl acrylate and/or ethylene vinyl acetate.

20. The adhesive of claim 18 wherein the phenol modified rosin-terpene has an average molecular weight to softening point ratio of less than about 10.

* * * * *